United States Patent
David et al.

(10) Patent No.: US 11,151,005 B2
(45) Date of Patent: Oct. 19, 2021

(54) SYSTEM AND METHOD FOR STORAGE NODE DATA SYNCHRONIZATION

(71) Applicant: EMC IP Holding Company, LLC, Hopkinton, MA (US)

(72) Inventors: Bar David, Rishon Lezion (IL); Vladimir Shveidel, Pardes-Hana (IL)

(73) Assignee: EMC Holding Company, LLC, Hopkinton, MA (US)

( * ) Notice: Subject to any disclaimer, the term of this patent is extended or adjusted under 35 U.S.C. 154(b) by 69 days.

(21) Appl. No.: 16/669,693

(22) Filed: Oct. 31, 2019

(65) Prior Publication Data

US 2021/0133060 A1 May 6, 2021

(51) Int. Cl.
  *G06F 12/00* (2006.01)
  *G06F 11/20* (2006.01)
  *G06F 11/16* (2006.01)
  *G06F 3/06* (2006.01)

(52) U.S. Cl.
  CPC ........ *G06F 11/2082* (2013.01); *G06F 3/0604* (2013.01); *G06F 3/067* (2013.01); *G06F 3/0614* (2013.01); *G06F 11/1662* (2013.01)

(58) Field of Classification Search
  CPC ............ G06F 11/0282; G06F 11/1662; G06F 11/1446; G06F 11/1458; G06F 11/1461; G06F 3/0604; G06F 3/0614; G06F 3/067; G06F 3/065; G06F 3/0646
  See application file for complete search history.

(56) References Cited

U.S. PATENT DOCUMENTS

2013/0246710 A1* 9/2013 Deguchi ............ G06F 11/2074
  711/129

* cited by examiner

*Primary Examiner* — Shawn X Gu
(74) *Attorney, Agent, or Firm* — Brian J. Colandreo; Mark H. Whittenberger; Holland & Knight LLP

(57) ABSTRACT

A method, computer program product, and computing system for writing, from a first node to a second node, a first portion of data from a memory pool in the first node defined by, at least in part, a first pointer. One or more input/output (IO) operations may be received while writing the first portion of data to the second node. Data from the one or more IO operations may be stored within the memory pool after the first pointer.

11 Claims, 8 Drawing Sheets

SYSTEM AND METHOD FOR STORAGE NODE DATA SYNCHRONIZATION

BACKGROUND

Storing and safeguarding electronic content may be beneficial in modern business and elsewhere. Accordingly, various methodologies may be employed to protect and distribute such electronic content.

Multiple storage nodes of a storage cluster may be configured in an active/active configuration where processing of data by one storage node may be synchronized to the other storage node(s). However, if and when one of the storage nodes fails, data between the storage nodes may become desynchronized and synchronizing the storage nodes may require suspending input/output (IO) operations while the data is synchronized. This suspension may generally be referred to as a "hiccup". In some implementations, the performance of the storage cluster operating in a degraded mode (e.g., when one of the nodes has failed) in combination with the long suspension of I/O operations required by conventional storage node fail-back operations may cause hiccup(s) and an undesirable client experience during a recovery or fail-back operation.

SUMMARY OF DISCLOSURE

In one example implementation, a computer-implemented method executed on a computing device may include, but is not limited to, writing, from a first node to a second node, a first portion of data from a memory pool in the first node defined by, at least in part, a first pointer. One or more input/output (IO) operations may be received while writing the first portion of data to the second node. Data from the one or more IO operations may be stored within the memory pool after the first pointer.

One or more of the following example features may be included. An indication of a failback operation for synchronizing data between the first node and the second node may be detected, wherein the first node may be an active node and the second node may be a recovering node of a multi-node active/active cluster. The first portion of data from the memory pool may be defined by data stored in the memory pool from a first address to the first pointer. A second pointer configured to point to the end of the data from the one or more IO operations within the memory pool may be generated. A second portion of data from the memory pool defined by data stored in the memory pool between the first pointer and the second pointer may be written from the first node to the second node. Data from additional IO operations may be stored within the memory pool after the second pointer while writing the second portion of data from the memory pool to the second node. Additional pointers and portions of data may be repeatedly generated within the memory pool until a size of the portion of data within the memory pool to write to the second node is less than a predefined threshold, thus defining a final portion of data within the memory pool. Additional IO operations may be suspended. The final portion of data may be written from the memory pool to the second node.

In another example implementation, a computer program product resides on a computer readable medium that has a plurality of instructions stored on it. When executed by a processor, the instructions cause the processor to perform operations that may include, but are not limited to, writing, from a first node to a second node, a first portion of data from a memory pool in the first node defined by, at least in part, a first pointer. One or more input/output (IO) operations may be received while writing the first portion of data to the second node. Data from the one or more IO operations may be stored within the memory pool after the first pointer.

One or more of the following example features may be included. An indication of a failback operation for synchronizing data between the first node and the second node may be detected, wherein the first node may be an active node and the second node may be a recovering node of a multi-node active/active cluster. The first portion of data from the memory pool may be defined by data stored in the memory pool from a first address to the first pointer. A second pointer configured to point to the end of the data from the one or more IO operations within the memory pool may be generated. A second portion of data from the memory pool defined by data stored in the memory pool between the first pointer and the second pointer may be written from the first node to the second node. Data from additional IO operations may be stored within the memory pool after the second pointer while writing the second portion of data from the memory pool to the second node. Additional pointers and portions of data may be repeatedly generated within the memory pool until a size of the portion of data within the memory pool to write to the second node is less than a predefined threshold, thus defining a final portion of data within the memory pool. The final portion of data may be written from the memory pool to the second node. Additional IO operations may be suspended. The final portion of data may be written from the memory pool to the second node.

In another example implementation, a computing system includes at least one processor and at least one memory architecture coupled with the at least one processor, wherein the at least one processor may be configured to write, from a first node to a second node, a first portion of data from a memory pool in the first node defined by, at least in part, a first pointer. The at least one processor may be further configured to receive one or more input/output (IO) operations while writing the first portion of data to the second node. The at least one processor may be further configured to store data from the one or more IO operations within the memory pool after the first pointer.

One or more of the following example features may be included. An indication of a failback operation for synchronizing data between the first node and the second node may be detected, wherein the first node may be an active node and the second node may be a recovering node of a multi-node active/active cluster. The first portion of data from the memory pool may be defined by data stored in the memory pool from a first address to the first pointer. A second pointer configured to point to the end of the data from the one or more IO operations within the memory pool may be generated. A second portion of data from the memory pool defined by data stored in the memory pool between the first pointer and the second pointer may be written from the first node to the second node. Data from additional IO operations may be stored within the memory pool after the second pointer while writing the second portion of data from the memory pool to the second node. Additional pointers and portions of data may be repeatedly generated within the memory pool until a size of the portion of data within the memory pool to write to the second node is less than a predefined threshold, thus defining a final portion of data within the memory pool. The final portion of data may be written from the memory pool to the second node. Additional IO operations may be suspended. The final portion of data may be written from the memory pool to the second node.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
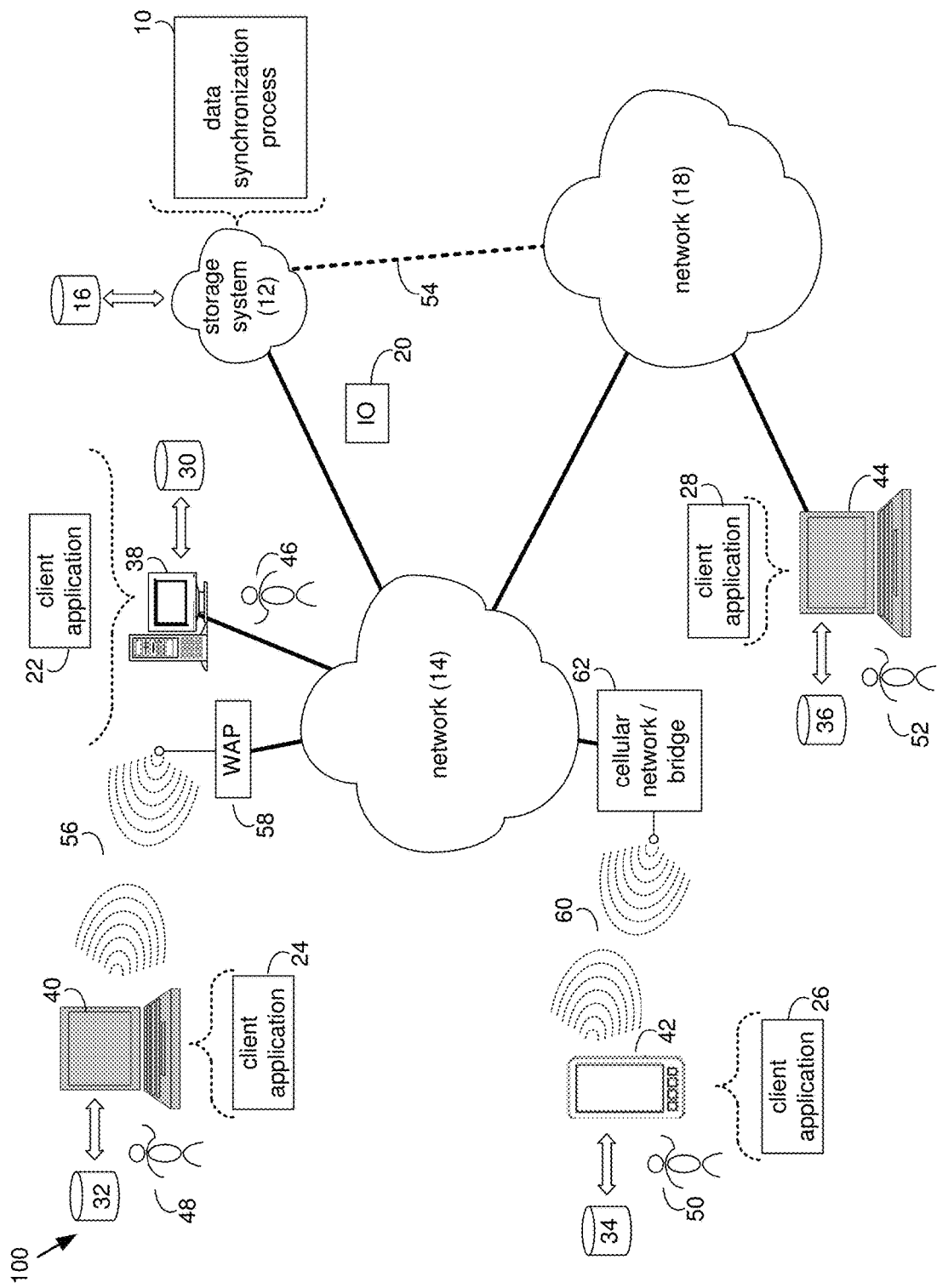
FIG. 1 is an example diagrammatic view of a storage system and a data synchronization process coupled to a distributed computing network according to one or more example implementations of the disclosure.

System Overview:

Referring to FIG. 1, there is shown data synchronization process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of data synchronization process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of data synchronization process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a data synchronization process, such as data synchronization process 10 of FIG. 1, may include but is not limited to, writing, from a first node to a second node, a first portion of data from a memory pool in the first node defined by, at least in part, a first pointer. One or more input/output (IO) operations may be received while writing the first portion of data to the second node. Data from the one or more IO operations may be stored within the memory pool after the first pointer.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
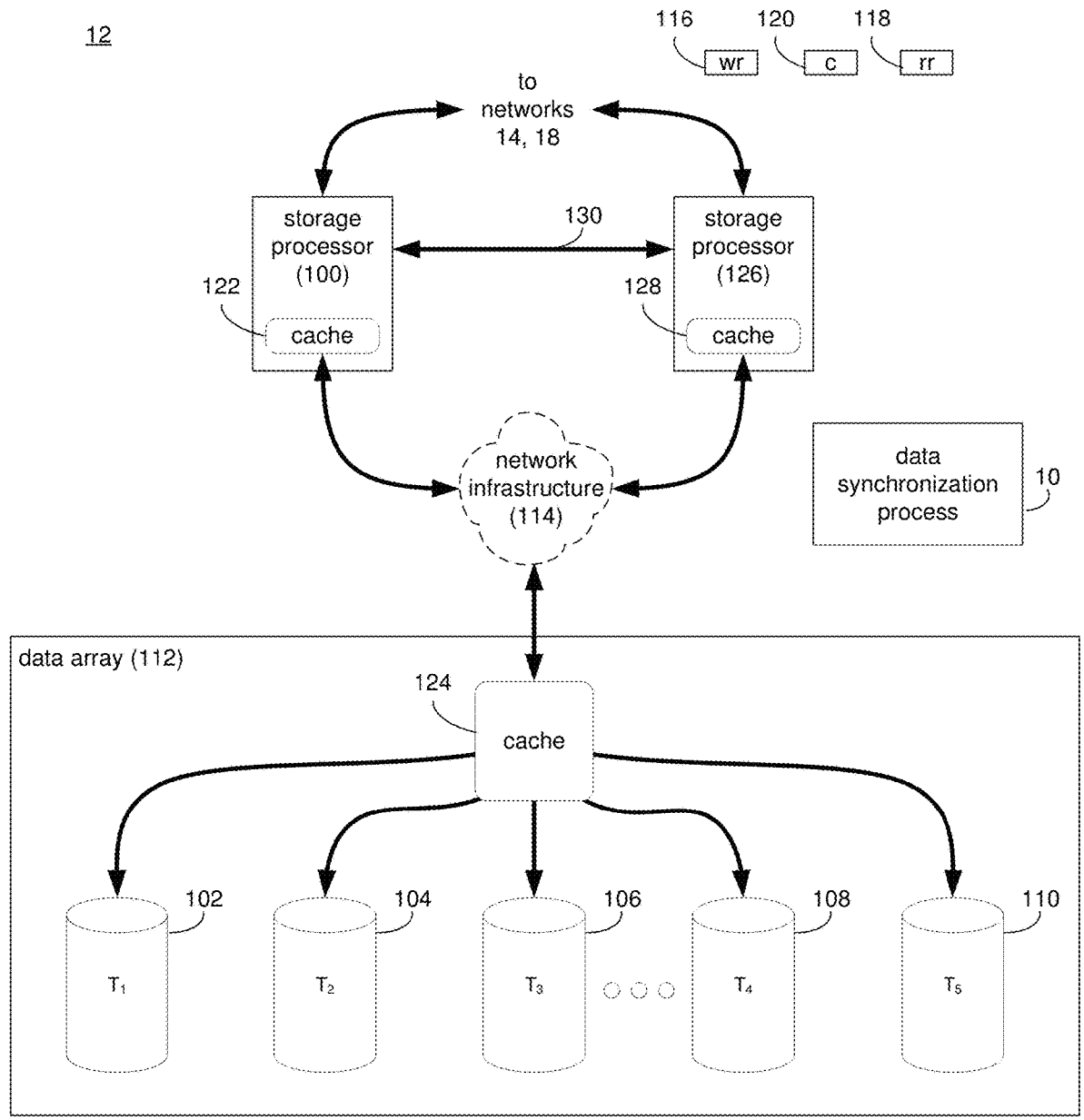
FIG. 2 is an example diagrammatic view of the storage system of FIG. 1 according to one or more example implementations of the disclosure.
Figure 3:
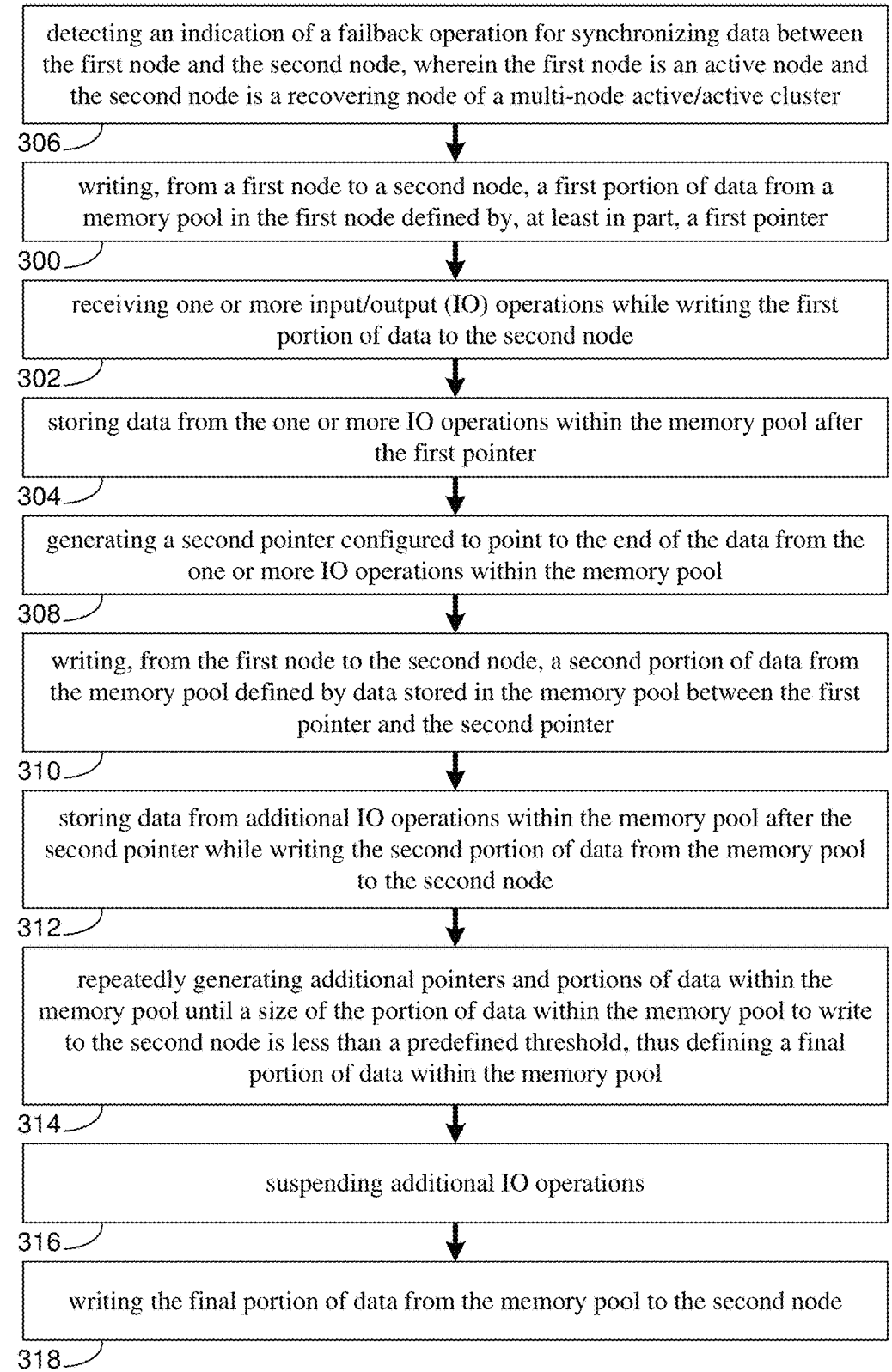
FIG. 3 is an example flowchart of the data synchronization process of FIG. 1 according to one or more example implementations of the disclosure.
Figure 4:
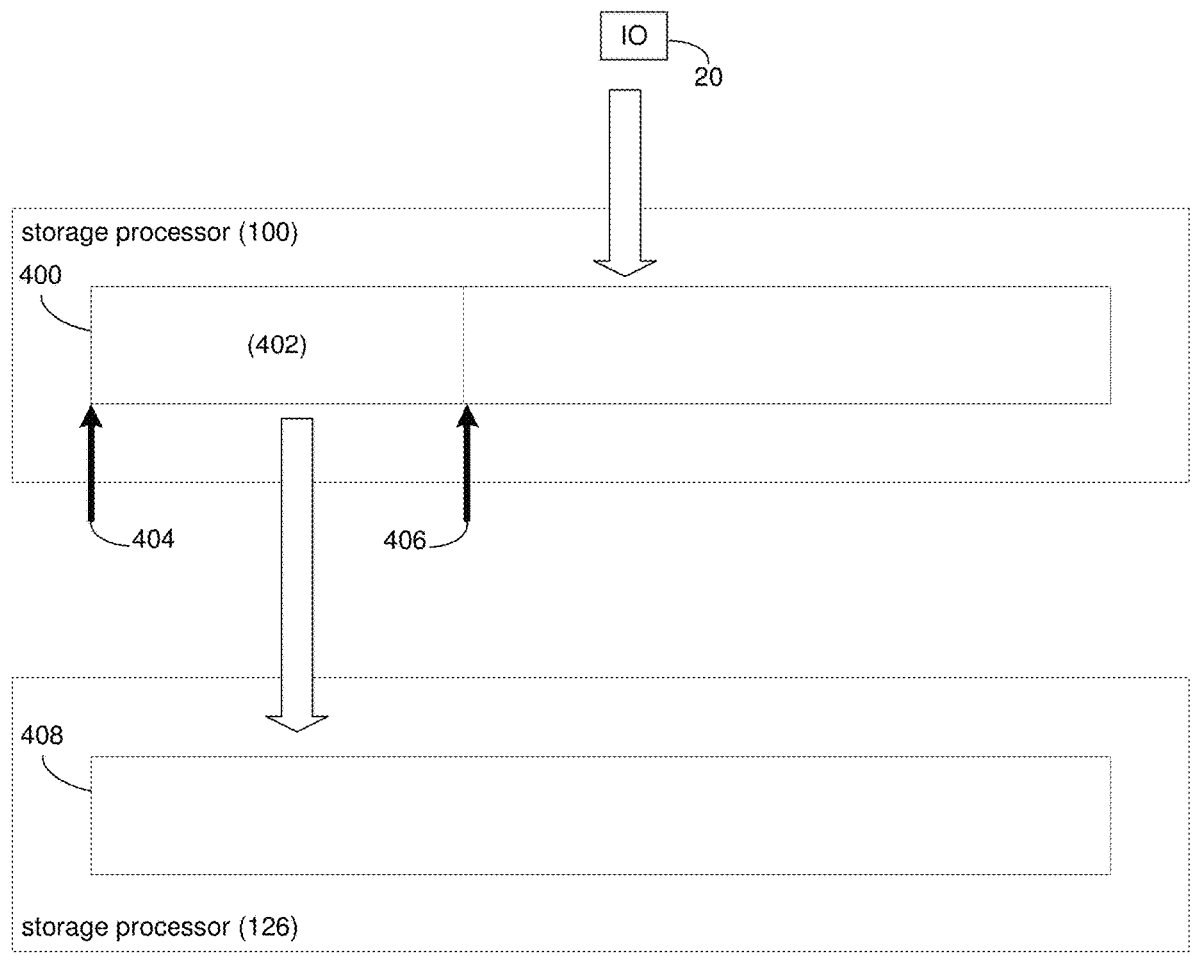
FIGS. 4-8 are example diagrammatic views of memory pools in the first and second nodes according to one or more example implementations of the disclosure.

The Storage System:

Referring also to FIG. 2, storage system 12 may include storage processor 100 and a plurality of storage targets T 1–n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniB and network, or any other circuit switched/packet switched network.

Storage system 12 may execute all or a portion of data synchronization process 10. The instruction sets and subroutines of data synchronization process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of data synchronization process 10 may be stored on storage devices (and/or executed by processors and memory architectures) that are external to storage system 12.

As discussed above, various IO requests or commands (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of data synchronization process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of data synchronization process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

In some implementations, storage system 12 may include multi-node active/active storage clusters configured to provide high availability to a user. As is known in the art, the term "high availability" may generally refer to systems or components that are durable and likely to operate continuously without failure for a long time. For example, an active/active storage cluster may be made up of at least two nodes (e.g., storage processors 100, 126), both actively running the same kind of service(s) simultaneously. One purpose of an active-active cluster may be to achieve load balancing. Load balancing may distribute workloads across all nodes in order to prevent any single node from getting overloaded. Because there are more nodes available to serve, there will also be a marked improvement in throughput and response times. Another purpose of an active-active cluster may be to provide at least one active node in the event that one of the nodes in the active-active cluster fails.

In some implementations, storage processor 126 may function like storage processor 100. For example, during operation of storage processor 126, content 118 to be written to storage system 12 may be processed by storage processor 126. Additionally/alternatively and when storage processor 126 is configured as an application server, content 118 to be written to storage system 12 may be internally generated by storage processor 126.

Storage processor 126 may include frontend cache memory system 128. Examples of frontend cache memory system 128 may include but are not limited to a volatile, solid-state, cache memory system (e.g., a dynamic RAM cache memory system) and/or a non-volatile, solid-state, cache memory system (e.g., a flash-based, cache memory system).

Storage processor 126 may initially store content 118 within frontend cache memory system 126. Depending upon the manner in which frontend cache memory system 128 is configured, storage processor 126 may immediately write content 118 to data array 112 (if frontend cache memory system 128 is configured as a write-through cache) or may subsequently write content 118 to data array 112 (if frontend cache memory system 128 is configured as a write-back cache).

In some implementations, the instruction sets and subroutines of data synchronization process 10, which may be stored on storage device 16 included within storage system 12, may be executed by one or more processors (not shown) and one or more memory architectures (not shown) included within storage system 12. Accordingly, in addition to being executed on storage processor 126, some or all of the instruction sets and subroutines of data synchronization process 10 may be executed by one or more processors (not shown) and one or more memory architectures (not shown) included within data array 112.

Further and as discussed above, during the operation of data array 112, content (e.g., content 118) to be written to data array 112 may be received from storage processor 126 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower).

As discussed above, storage processor 100 and storage processor 126 may be configured in an active/active configuration where processing of data by one storage processor may be synchronized to the other storage processor. For example, data may be synchronized between each storage processor via a separate link or connection (e.g., connection 130). In some implementations, one of the storage processors may fail which may cause a significant amount of desynchronization between the storage processors.

The Data Synchronization Process:

Referring also to FIGS. 3-8 and in some implementations, data synchronization process 10 may write 300, from a first node to a second node, a first portion of data from a memory pool in the first node defined by, at least in part, a first pointer. One or more input/output (IO) operations may be received 302 while writing the first portion of data to the second node. Data from the one or more IO operations may be stored 304 within the memory pool after the first pointer.

As will be discussed in greater detail below, implementations of the present disclosure may allow nodes of a storage cluster to transfer large portions of data during a failback operation while still receiving and storing new IO operations. For example and in some implementations, multi-node active/active storage clusters may provide high availability to a user. Due to the high availability requirement, data structures in each node may be synchronized between the nodes. However, because the in-memory data structures may be continuously updated in real-time, the conventional approach to synchronization of such data structures may generally require full update suspension and suspension of new IO operations until synchronization is completed. This suspension may generally be referred to as a "hiccup". In some implementations, the performance of the storage cluster operating in a degraded mode (e.g., when one of the nodes has failed) in combination with the long suspension of I/O operations required by conventional node fail-back operations may cause hiccup(s) and an undesirable client experience during a recovery or fail-back operation. In some implementations and as will be discussed in greater detail below, embodiments of the present disclosure may allow efficient synchronization/recovery of in-memory data structures by iterative transfer of large memory pool chunks between nodes.

In some implementations, data synchronization process 10 may detect 306 an indication of a failback operation for synchronizing data between the first node and the second node, wherein the first node is an active node and the second node is a recovering node of a multi-node active/active cluster. For example, in response to receiving an indication of a node failback operation, data synchronization process 10 may rebuild in-memory data structures either from non-volatile media or from other nodes in the cluster via a type of messaging.

Referring again to the example of FIG. 2 and in some implementations, suppose storage processor 100 and storage processor 126 are configured in an active/active cluster. Further suppose that storage processor 126 fails and is recovered. In some implementations, data synchronization process 10 may detect 306 an indication of a failback operation for synchronizing data between the first node (e.g., storage processor 100) and the second node (e.g., storage processor 126), where the first node (e.g., storage processor 100) is an active node and the second node (e.g., storage processor 126) is a recovering node.

In some implementations, data synchronization process 10 may write 300, from a first node to a second node, a first portion of data from a memory pool in the first node defined by, at least in part, a first pointer. Referring also to the example of FIG. 4 and in some implementations, a first node (e.g., storage processor 100) may include a memory pool (e.g., memory pool 400). A memory pool may generally refer to any collection of memory within a node. In some implementations, the first node (e.g., storage processor 100) may include various data structures that may be maintained as immutable append-only data structures that are sourced from an append-only memory pool. In some implementations, these data structures may be freed and reclaimed in their entirety. In some implementations, these data structures may be allocated from a memory pool (e.g., memory pool 400) in a sequential manner using a "head" indicator which may be incremented atomically by the size of the allocation. In this manner, data may be written to these data structures by writing to the "end" of the memory pool (e.g., after the "head" indicator).

In some implementations, one example of a data structure that may be formed from the memory pool is a hash-based sorted bucket. In some implementations, a hash-based sorted bucket may be associated with a particular metadata page. For example, each hash-based sorted bucket may store one or more changes associated with a particular metadata page. The hash-based sorted bucket may be stored in volatile memory. However, it will be appreciated that any data structure may be used within the scope of the present disclosure. In some implementations and as will be discussed in greater detail below, the portions of data that may be written 300 by data synchronization process 10 from storage processor 100 to storage processor 126 may include portions of the above-mentioned data structures.

In some implementations, the first portion of data from the memory pool may be defined by data stored in the memory pool from a first address to the first pointer. Referring again to the example of FIG. 4 and in some implementations, memory pool 400 may include a first portion of data (e.g., first portion 402) defined by data stored in memory pool 400 from a first address (e.g., address indicated by arrow 404) to a first pointer (e.g., first pointer 406). As discussed above and in some implementations, the first pointer (e.g., first pointer 406) may be a "head" indicator configured to indicate the current "end" of memory pool 400 or a data structure within memory pool 400. For example, based on the first pointer (e.g., first pointer 406), data synchronization process 10 may know where to write new data within memory pool 400. In some implementations, the first address (e.g., first address as indicated by arrow 404) may be a base or initial address of the memory pool (e.g., memory pool 400). In some implementations, the first address (e.g., first address as indicated by arrow 404) may be the initial address of a portion of the memory pool or a data structure within the memory pool that is selected for being written 300 to the second node (e.g., storage node 126).

In some implementations, the first pointer (e.g., first pointer 406) may be moved within the memory pool (e.g., memory pool 400) to indicate where new data is to be stored. Accordingly, the first portion of data (e.g., first portion of data 402) may be defined as the data in the memory pool (e.g., memory pool 400) between the first address (e.g., first address as indicated by arrow 404) and the first pointer (e.g., first pointer 406). In this manner, data synchronization process 10 may write any portion (e.g., first portion 402) of a plurality of portions of the memory pool (e.g., memory pool 400) of a first node (e.g., storage processor 100) to a memory pool (e.g., memory pool 408) of a second node (e.g., storage processor 126).

In some implementations, data synchronization process 10 may write 300 a first portion of data from a memory pool of the active node (e.g., storage processor 100) to the recovering node (e.g., storage processor 126) in response to detecting 306 the node fail-back indication. For example, the first portion of data (e.g., first portion of data 402) may represent the first portion of unsynchronized data in the memory pool (e.g., memory pool 400) or a data structure within the memory pool (e.g., memory pool 400) since the recovering node (e.g., storage node 126) failed. In this manner, data synchronization process 10 may record or monitor the first address (e.g., first address as indicated by arrow 404) of unsynchronized data of the memory pool (e.g., memory pool 400) or a data structure within the memory pool (e.g., memory pool 400). In some implementations, the first pointer (e.g., first pointer 406) may indicate the end of the unsynchronized data in the memory pool (e.g., memory pool 400) or a data structure within the memory pool (e.g., memory pool 400) and the point where new data may be written in the memory pool (e.g., memory pool 400).

In some implementations, data synchronization process 10 may receive 302 one or more input/output (IO) operations while writing the first portion of data to the second node. In some implementations and referring again to the example of FIG. 4, data synchronization process 10 may receive 302 one or more IO operations (e.g., IO operation 20) while writing the first portion of data (e.g., first portion of data 402) from the memory pool (e.g., memory pool 400) of the first node (e.g., storage processor 100) to the memory pool (e.g., memory pool 408) of the second node (e.g., second node 126). In some implementations, read and write IO operations (on active and recovering nodes) may be computationally inexpensive to process by the first node (e.g., storage processor 100) despite the potentially large amount of data being written 300 from the first node to the second node since these IO operations may be amortized sequential writes/reads. Accordingly, receiving 302 one or more IO operations while writing 300 the first portion of data to the second node may not noticeably waste system resources. In some implementations and as will be discussed in greater detail below, data synchronization process 10 may allow the first portion of data (e.g., first portion of data 402) to be written 300 to the second node (e.g., storage processor 126) without suspending IO operations.

In some implementations, data synchronization process 10 may store 304 data from the one or more IO operations within the memory pool after the first pointer. Referring again to the example of FIG. 4 and in some implementations, as the one or more IO operations (e.g., IO operation 20) are received 302 by data synchronization process 10 (at the first node (e.g., storage processor 100)), data synchronization process 10 may write 300 the first portion of data (e.g., first portion of data 402) from the memory pool (e.g., memory pool 400) of the first node (e.g., storage processor 100) to the second node (e.g., storage processor 126). In some implementations, data synchronization process 10 may store 304 the data from these one or more IO operations (e.g., IO operation 20) within the memory pool (e.g., memory pool 400) after the first pointer (e.g., first pointer 406). In this manner, any updates to the data structure of memory pool 400 which occur during the writing 300 of the first portion of data 402 may be easily tracked using first pointer 406 of memory pool 400 as any updates may be stored 304 in memory pool 400 after first pointer 406.

Figure 5:
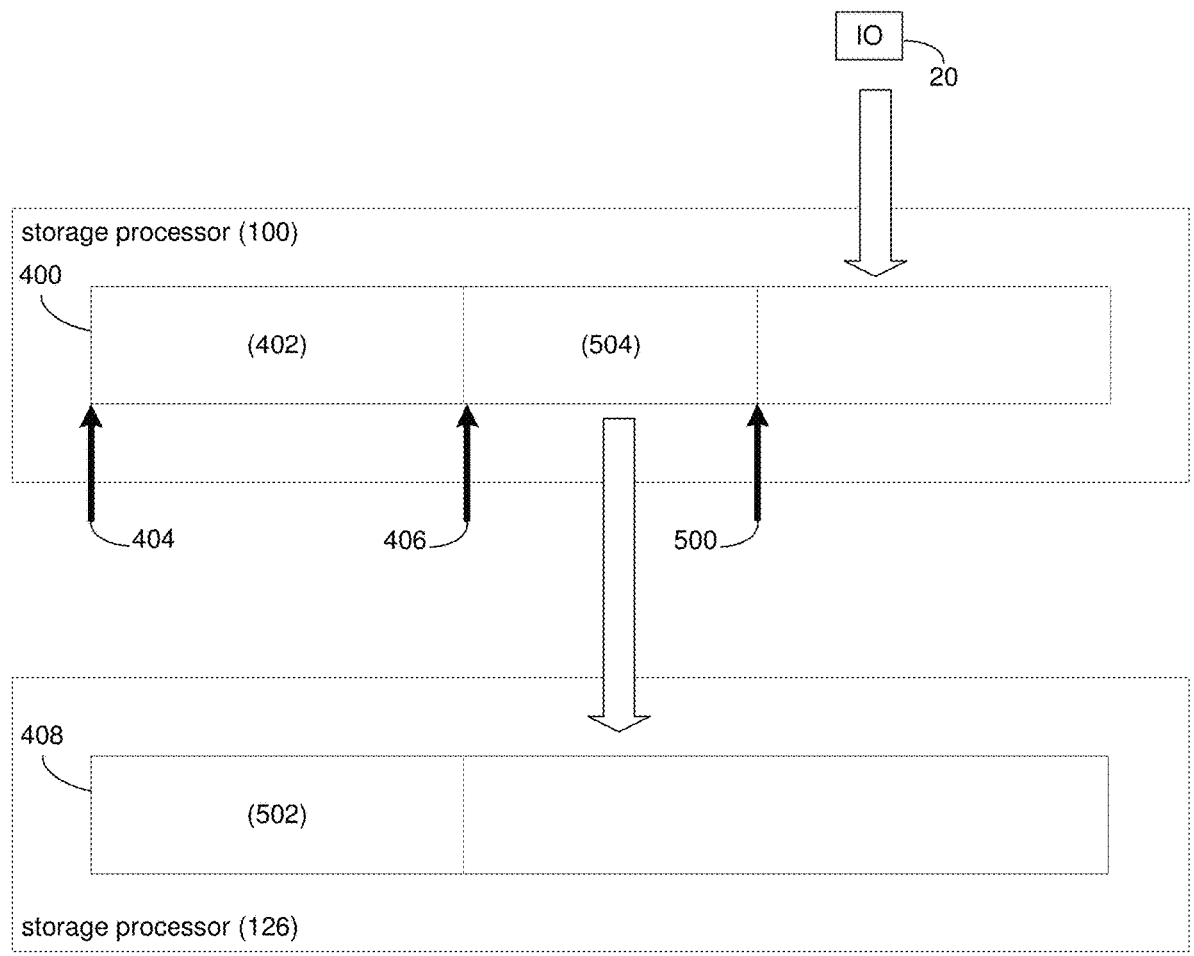

In some implementations, data synchronization process 10 may generate 308 a second pointer configured to point to the end of the data from the one or more IO operations within the memory pool. Referring also to the example of FIG. 5 and in some implementations, data synchronization process 10 may store 304 data from the one or more IO operations (e.g., IO operation 20) within the memory pool (e.g., memory pool 400) of the first node (e.g., storage processor 100) after the first pointer (e.g., first pointer 406). In some implementations, data synchronization process 10 may generate 308 a second pointer (e.g., second pointer 500) configured to point to the end of the data from the one or more IO operations (e.g., IO operation 20) in response to data synchronization process 10 finishing the writing 300 of the first portion of data (e.g., first portion of data 402) to the memory pool (e.g., memory pool 408) of the second node (e.g., storage processor 126). As shown in the example of FIG. 5, the first portion of data 402 may be stored 304 in memory pool 408 of storage processor 126 as first portion of data 502. In this manner, data synchronization process 10 may synchronize first portion of data 402 across the nodes while receiving 302 one or more IO operations. In some implementations, data synchronization process 10 may generate 308 the second pointer (e.g., second pointer 500) to indicate a second portion of data for writing 310 from the first node (e.g., storage processor 100) to the second node (e.g., storage processor 126).

In some implementations, data synchronization process 10 may write 310, from the first node to the second node, a second portion of data from the memory pool defined by data stored in the memory pool between the first pointer and the second pointer. Referring again to the example of FIG. 5 and in some implementations, data synchronization process 10 may write 310 a second portion of data (e.g., second portion of data 504) from the first node (e.g., storage processor 100) to the second node (e.g., storage processor 126). In some implementations, the second portion of data (e.g., second portion of data 504) may be defined by data stored in the memory pool (e.g., memory pool 400) between the first pointer (e.g., first pointer 406) and the second pointer (e.g., second pointer 500).

Returning to the above example where data synchronization process 10 detects 306 an indication of a failback operation for synchronizing data between the active node (e.g., storage processor 100) and the recovering node (e.g., storage processor 126), data synchronization process 10 may transfer these updates (e.g., second portion of data 504 from the previous head (e.g., first pointer 406) to the current head (e.g., second pointer 500) of the memory pool (e.g., memory pool 400) from the active node (e.g., storage processor 100) to the recovering node (e.g., storage processor 126) in the same way as described above for the first portion of data. In some implementations, the amount of data of the second portion of data (e.g., second portion of data 504) may be e.g., an order of magnitude less than the first portion of data (e.g., first portion of data 402) as the second portion of data (e.g., second portion of data 504) may only include updates that happened during the writing 300 of the first portion of data (e.g., first portion of data 402). However, it will be appreciated that the second portion of data may be any size relative to the first portion of data within the scope of the present disclosure.

In some implementations, data synchronization process 10 may store 312 data from additional IO operations within the memory pool after the second pointer while writing 310 the second portion of data from the memory pool to the second node. Referring again to the example of FIG. 5 and in some implementations, data synchronization process 10 may receive additional IO operations (e.g., IO operation 20) while writing 310 the second portion of data (e.g., second portion of data 504) to the second node (e.g., storage processor 126). In some implementations and as discussed above, data synchronization process 10 may store 312 the data from these one or more IO operations (e.g., IO operation 20) within the memory pool (e.g., memory pool 400) after the second pointer (e.g., second pointer 500). In this manner, any updates to the data structure of memory pool 400 which occur during the writing 310 of the second portion of data 504 may be tracked using second pointer 500 of memory pool 400 as any updates may be stored 312 in memory pool 400 after second pointer 500.

Figure 6:
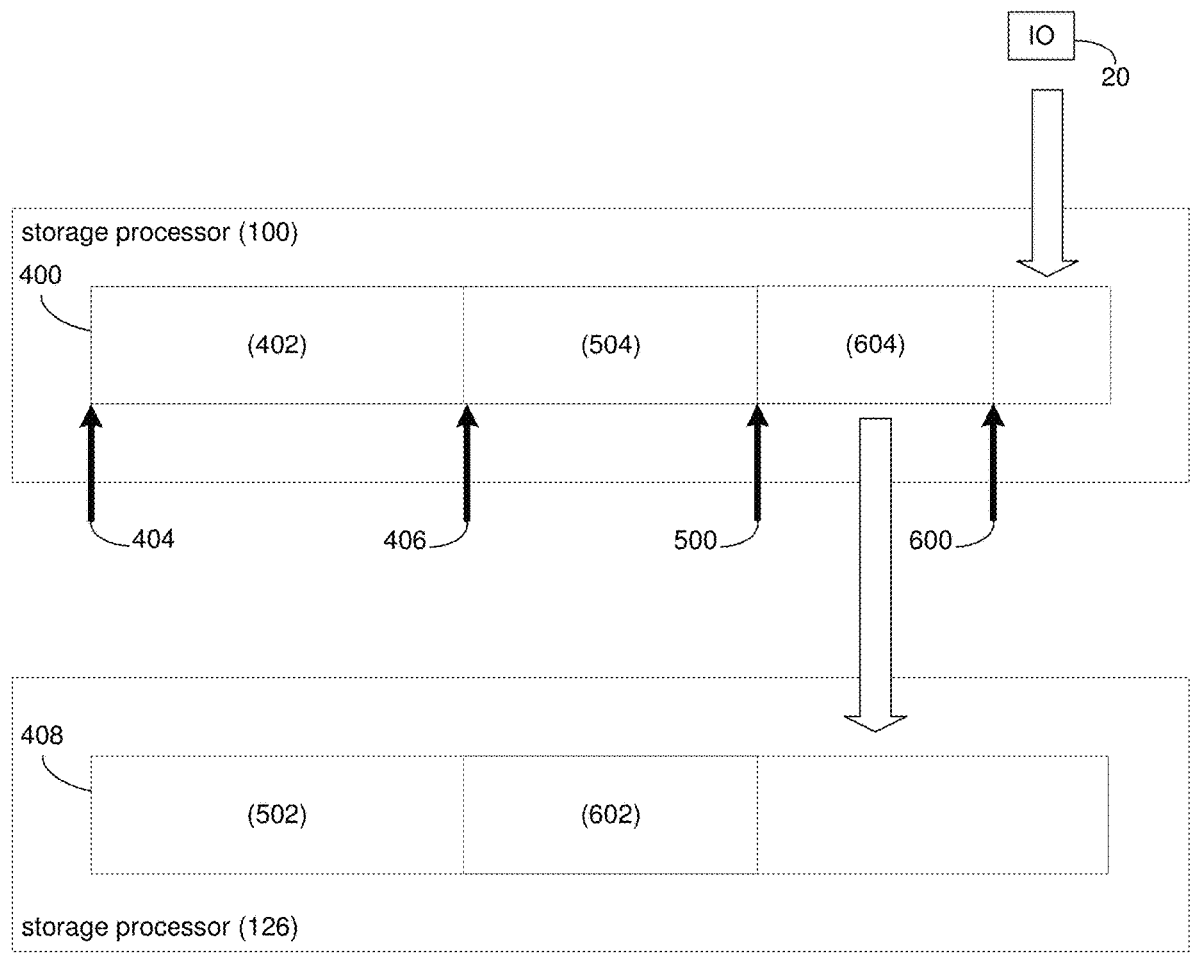

In some implementations, data synchronization process 10 may repeatedly or iteratively generate 314 additional pointers and portions of data within the memory pool until a size of the portion of data within the memory pool to write to the second node is less than a predefined threshold, thus defining a final portion of data within the memory pool. Referring also to the example of FIG. 6 and in some implementations, data synchronization process 10 may store data from the one or more additional IO operations (e.g., IO operation 20) within the memory pool (e.g., memory pool 400) of the first node (e.g., storage processor 100) after the second pointer (e.g., second pointer 500). In some implementations, data synchronization process 10 may generate 312 a third pointer (e.g., third pointer 600) configured to point to the end of the data from the one or more IO operations (e.g., IO operation 20) in response to data synchronization process 10 finishing the writing 310 of the second portion of data (e.g., second portion of data 504) to the memory pool (e.g., memory pool 408) of the second node (e.g., storage processor 126). As shown in the example of FIG. 6, the second portion of data 504 may be stored 312 in memory pool 408 of storage processor 126 as second portion of data 602. In this manner, data synchronization process 10 may synchronize second portion of data 504 across the nodes while receiving one or more additional IO operations. In some implementations, data synchronization process 10 may generate 314 the third pointer (e.g., third pointer 600) to indicate a third portion of data for writing from the first node (e.g., storage processor 100) to the second node (e.g., storage processor 126).

In some implementations, data synchronization process 10 may write, from the first node to the second node, additional portions of data from the memory pool defined by data stored in the memory pool between additional pairs of pointer. Referring again to the example of FIG. 6 and in some implementations, data synchronization process 10 may write a third portion of data (e.g., third portion of data 604) from the first node (e.g., storage processor 100) to the second node (e.g., storage processor 126). In some implementations, the third portion of data (e.g., third portion of data 604) may be defined by data stored in the memory pool (e.g., memory pool 400) between the second pointer (e.g., second pointer 500) and the third pointer (e.g., third pointer 600).

Returning to the above example where data synchronization process 10 detects 306 an indication of a failback operation for synchronizing data between the active node (e.g., storage processor 100) and the recovering node (e.g., storage processor 126), data synchronization process 10 may transfer these updates (e.g., third portion of data 604 from the previous head (e.g., second pointer 500) to the current head (e.g., third pointer 600) from the active node (e.g., storage processor 100) to the recovering node (e.g., storage processor 126) in the same way as described above for the first and second portions of data.

As discussed above and in some implementations, data synchronization process 10 may repeatedly or iteratively generate 314 additional pointers and portions of data within the memory pool until a size of the portion of data within the memory pool to write to the second node is less than a predefined threshold, thus defining a final portion of data within the memory pool. Referring also to the example of FIG. 7 and in some implementations, data synchronization process 10 may store data from the one or more additional IO operations (e.g., IO operation 20) within the memory pool (e.g., memory pool 400) of the first node (e.g., storage processor 100) after the third pointer (e.g., third pointer 600). In some implementations, data synchronization process 10 may generate 314 a fourth pointer (e.g., fourth pointer 700) configured to point to the end of the data from the one or more IO operations (e.g., IO operation 20) in response to data synchronization process 10 finishing the writing of the third portion of data (e.g., third portion of data 602) to the memory pool (e.g., memory pool 408) of the second node (e.g., storage processor 126). As shown in the example of FIG. 7, the third portion of data 604 may be stored in memory pool 408 of storage processor 126 as third portion of data 702.

Figure 7:
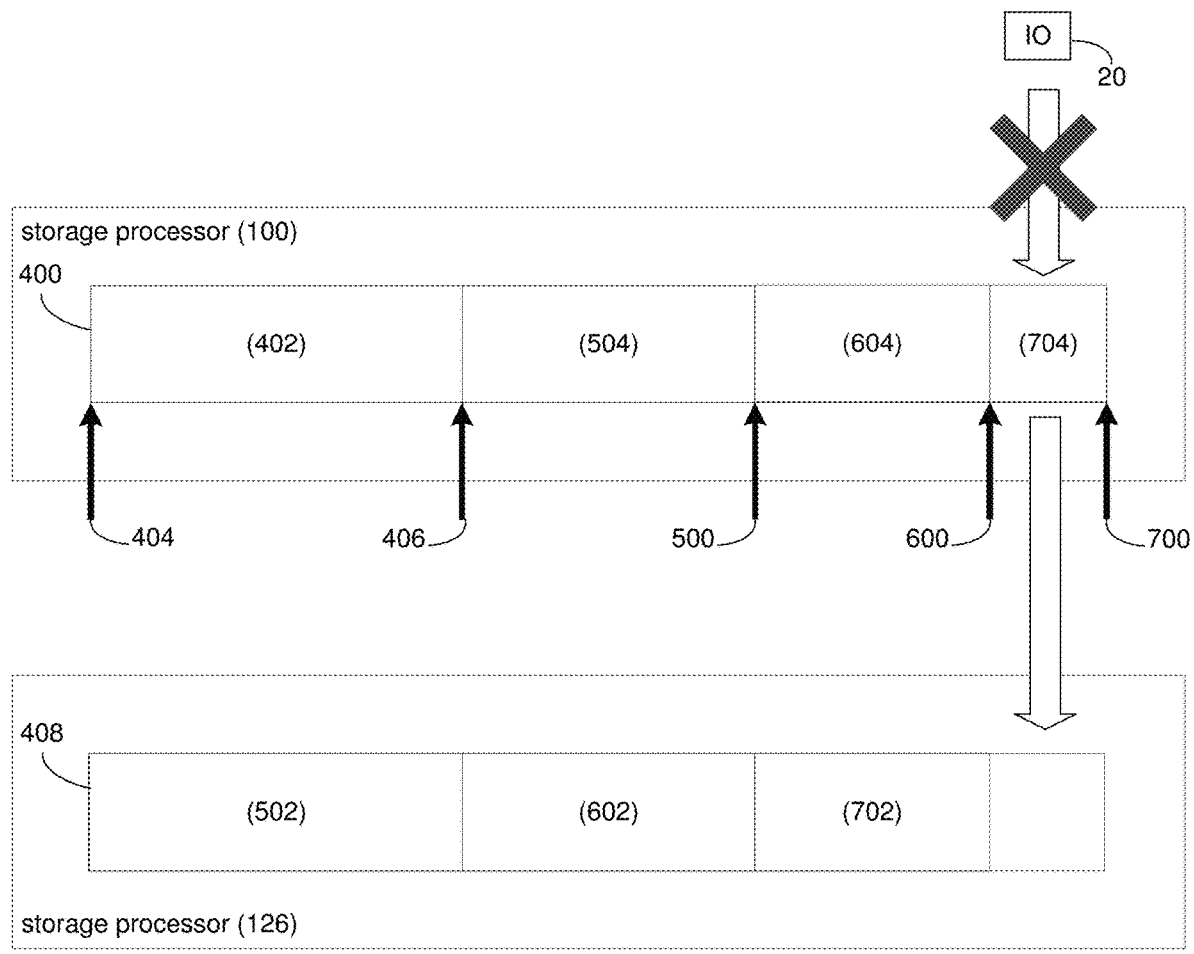

However, in the example of FIG. 7, data synchronization process 10 may determine that the size of the memory pool between the third pointer (e.g., third pointer 600) and the fourth pointer (e.g., fourth pointer 700) is less than or smaller than a predefined threshold. In some implementations, the predefined threshold may be user-defined and/or automatically defined by data synchronization process 10. In some implementations, because data synchronization process 10 has determined that the size of the updates in the memory pool (e.g., size of memory pool between the third pointer (e.g., third pointer 600) and the fourth pointer (e.g., fourth pointer 700) is less than or smaller than a predefined threshold, data synchronization process 10 may identify the portion of data in the memory pool (e.g., memory pool 400) as the final portion of data (e.g., final portion of data 704).

In some implementations, data synchronization process 10 may suspend 316 additional IO operations. For example and unlike the previous examples where IO operations continue to be received and stored by data synchronization process 10 in the memory pool of the first node, data synchronization process 10 may use the predefined threshold to determine when to suspend 316 additional IO operations. In this manner, since the size of the final portion of data is as small and configurable as a user may desire, the suspension time may be minimal. As shown in the example of FIG. 7, data synchronization process 10 may suspend 316 additional IO operations (e.g., IO 20), where suspending 316 the additional IO operations is represented by the large "X" over the arrow between IO operation 20 and memory pool 400 of storage processor 100.

In some implementations, data synchronization process 10 may write 318 the final portion of data from the memory pool to the second node. In some implementations and referring again to the example of FIG. 7, data synchronization process 10 may write 318 the final portion of data (e.g., final portion of data 704) from the memory pool (e.g., memory pool 400) to the second node (e.g., storage processor 126) while the one or more additional IO operations (e.g., IO 20) are suspended 316. In this manner, data synchronization process 10 may ensure that once final portion of data 704 is written 318 to the second node, the first and second nodes may be synchronized (i.e., the first and second nodes may include the same synchronized portions of data).

While the above examples include writing e.g., three portions of data to the second node before the size of the final portion of data is determined by data synchronization process 100 to be smaller than the predefined threshold, it will be appreciated that any number of iterations may occur (e.g., generating additional pointers and writing and storing additional portions of data) before a portion of data is identified with a size smaller than the predefined threshold. For example, data synchronization process 10 may write the first portion of data and data synchronization process 10 may determine that the second portion of data is smaller than the predefined threshold. In this example, data synchronization process 10 may write e.g., only two portions of data.

Figure 8:
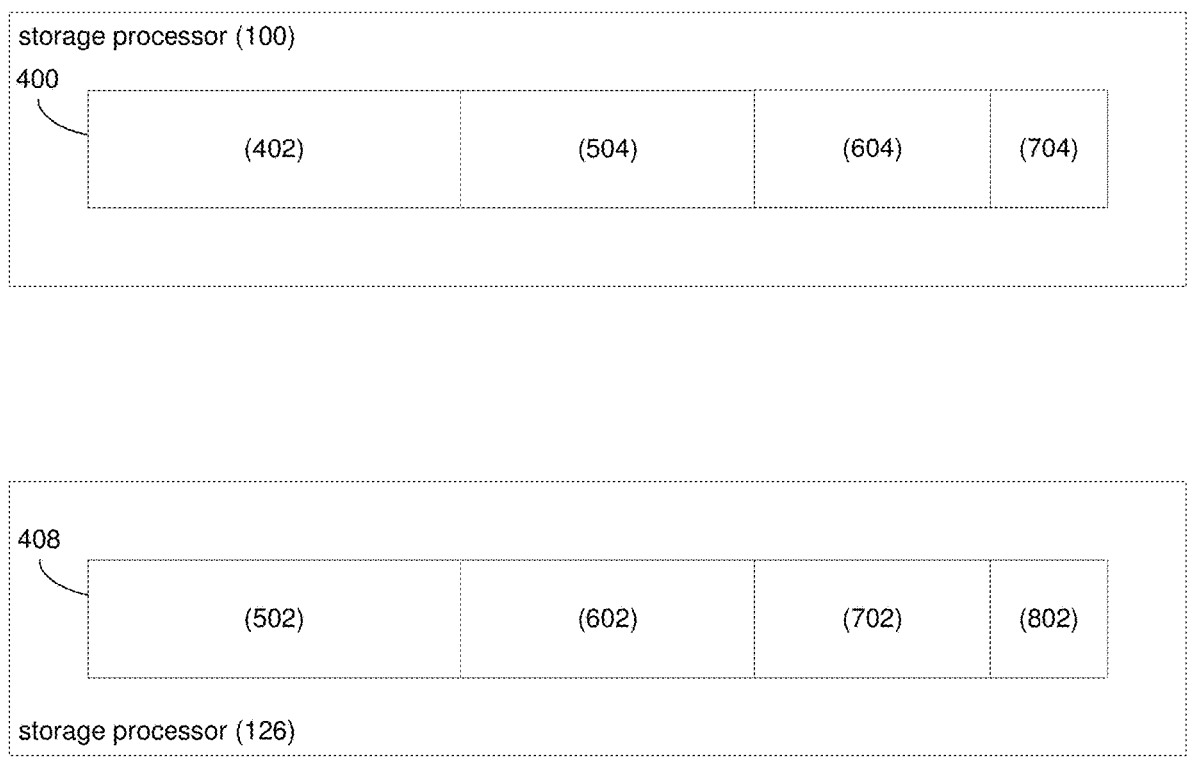

Referring also to the example of FIG. 8 and in some implementations, the final portion of data 704 may be stored in memory pool 408 of storage processor 126 as final portion of data 802. In some implementations and in response to writing 318 the final portion of data (e.g., final portion of data 704) from the memory pool (e.g., memory pool 400) to the second node (e.g., storage processor 126), data synchronization process 10 may resume processing the additional IO operations (e.g., IO 20). In this manner, data synchronization process 10 may synchronize updates received to the memory pool across the nodes while receiving one or more additional IO operations. Accordingly, data synchronization process 10 may minimize the amount of time the IO operations are suspended based on the predefined threshold of the final portion of data. In this manner, data synchronization process 10 may synchronize the memory pools of an active node and a recovering node with minimal hiccups and maximum IO processing.

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
   writing, from a first node to a second node, a first portion of data from a memory pool in the first node defined by, at least in part, a first pointer;
   receiving one or more input/output (IO) operations while writing the first portion of data to the second node;
   storing data from the one or more IO operations within the memory pool after the first pointer;
   generating a second pointer configured to point to the end of the data from the one or more IO operations within the memory pool;
   writing, from the first node to the second node, a second portion of data from the memory pool defined by data stored in the memory pool between the first pointer and the second pointer;
   storing data from additional IO operations within the memory pool after the second pointer while writing the second portion of data from the memory pool to the second node; and
   repeatedly generating additional pointers and portions of data within the memory pool until a size of the portions of data within the memory pool to write to the second node is less than a predefined threshold, thus defining a final portion of data within the memory pool.

2. The computer-implemented method of claim 1, further comprising:
   detecting an indication of a failback operation for synchronizing data between the first node and the second node, wherein the first node is an active node and the second node is a recovering node of a multi-node active/active cluster.

3. The computer-implemented method of claim 1, wherein the first portion of data from the memory pool is defined by data stored in the memory pool from a first address to the first pointer.

4. The computer-implemented method of claim 1, further comprising:
   suspending additional IO operations; and
   writing the final portion of data from the memory pool to the second node.

5. A computer program product residing on a non-transitory computer readable storage medium having a plurality of instructions stored thereon which, when executed by a processor, cause the processor to perform operations comprising:
   writing, from a first node to a second node, a first portion of data from a memory pool in the first node defined by, at least in part, a first pointer;
   receiving one or more input/output (IO) operations while writing the first portion of data to the second node;
   storing data from the one or more IO operations within the memory pool after the first pointer;
   generating a second pointer configured to point to the end of the data from the one or more IO operations within the memory pool;
   writing, from the first node to the second node, a second portion of data from the memory pool defined by data stored in the memory pool between the first pointer and the second pointer;
   storing data from additional IO operations within the memory pool after the second pointer while writing the second portion of data from the memory pool to the second node; and
   repeatedly generating additional pointers and portions of data within the memory pool until a size of the portions of data within the memory pool to write to the second node is less than a predefined threshold, thus defining a final portion of data within the memory pool.

6. The computer program product of claim 5, wherein the operations further comprise:
   detecting an indication of a failback operation for synchronizing data between the first node and the second node, wherein the first node is an active node and the second node is a recovering node of a multi-node active/active cluster.

7. The computer program product of claim 5, wherein the first portion of data from the memory pool is defined by data stored in the memory pool from a first address to the first pointer.

8. The computer program product of claim 5, wherein the operations further comprise:
   suspending additional IO operations; and
   writing the final portion of data from the memory pool to the second node.

9. Computing system comprising:
   a memory; and
   a processor configured to write, from a first node to a second node, a first portion of data from a memory pool in the first node defined by, at least in part, a first pointer, wherein the processor is further configured to receive one or more input/output (IO) operations while writing the first portion of data to the second node, wherein the processor is further configured to store data from the one or more IO operations within the memory pool after the first pointer, wherein the processor is further configured to generate a second pointer configured to point to the end of the data from the one or more IO operations within the memory pool, wherein the processor is further configured to write, from the first node to the second node, a second portion of data from the memory pool defined by data stored in the memory pool between the first pointer and the second pointer, wherein the processor is further configured to store data from additional IO operations within the memory pool after the second pointer while writing the second portion of data from the memory pool to the second node, and wherein the processor is further configured to repeatedly generate additional pointers and portions of data within the memory pool until a size of the portions of data within the memory pool to write to the second node is less than a predefined threshold, thus defining a final portion of data within the memory pool.

10. The computing system of claim 9, wherein the processor is further configured to:
    detect an indication of a failback operation for synchronizing data between the first node and the second node, wherein the first node is an active node and the second node is a recovering node of a multi-node active/active cluster.

11. The computing system of claim 9, wherein the first portion of data from the memory pool is defined by data stored in the memory pool from a first address to the first pointer.

* * * * *